US006457002B1

(12) United States Patent
Beattie et al.

(10) Patent No.: US 6,457,002 B1
(45) Date of Patent: Sep. 24, 2002

(54) SYSTEM AND METHOD FOR MAINTAINING A KNOWLEDGE BASE AND EVIDENCE SET

(75) Inventors: Thomas W. Beattie, Metuchen; Deborah L. McGuiness, Summit; Harley Manning, Maplewood; Lori Alperin Resnick, Highland Park, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/832,221

(22) Filed: Apr. 11, 2001

Related U.S. Application Data (62) Division of application No. 09/102,751, filed on Jun. 23, 1998, now Pat. No. 6,256,627.
(60) Provisional application No. 60/051,965, filed on Jul. 8, 1997, provisional application No. 60/088,224, filed on Jun. 5, 1998, and provisional application No. 60/074,780, filed on Feb. 17, 1998.

(51) Int. Cl.[7] .............................................. G06F 17/30
(52) U.S. Cl. ...................... 707/3; 707/5; 707/6; 707/10
(58) Field of Search .............................. 707/1, 3, 5, 6, 707/10, 500

(56) References Cited

U.S. PATENT DOCUMENTS

| | | | | |
|---|---|---|---|---|
| 5,081,598 A | * | 1/1992 | Bellows et al. .............. | 702/184 |
| 5,123,057 A | * | 6/1992 | Verly et al. .................. | 382/156 |
| 5,159,667 A | * | 10/1992 | Borrey et al. ................ | 707/500 |
| 5,406,477 A | * | 4/1995 | Harhen ........................... | 703/6 |
| 5,720,008 A | * | 2/1998 | McGuinness et al. .......... | 706/50 |
| 5,778,364 A | * | 7/1998 | Nelson ........................... | 707/6 |
| 5,809,499 A | * | 9/1998 | Wong et al. .................... | 707/6 |

OTHER PUBLICATIONS

IEEE publication, Combining Ambiguous Evidence with Respect to Ambiquous a prior Knowledge, I: Boolean Logic, by Ronald P.S. Mahler, IEEE transactions on systems, man and cybernetics—part A, vol. 26.No. 1, pp 1–41, Jan. 1996.*

Sageware, Inc., *Our Products: Sageware's Knowledge Sets* (accessed on Apr. 14, 2000; ©1998–2000), <http://www.sageware.com/products.html>.

Verity, Inc., *Introduction to Topics Guide V2.0* (accessed Mar. 21, 1998; ©Sep. 23, 1996), <http://www.verity.com/support/s97dk/topic20/topcover.htm>.

Ramesh S. Patil et al., *The DARPA Knowledge Sharing Effort: Progress Report*, KR'92 Principles of Knowledge Representation and Reasoning, Proceedings of the Third International Conference (Oct. 25, 1992).

Peter F. Patel–Schneider and Bill Swartout, *Description–Logic Knowledge Representation System Specification from the KRSS Group of the ARPA Knowledge Sharing Effort* (Nov. 1, 1993).

Robert MacGregor, *The Evolving Technology of Classification–based Knowledge Representation Systems* (in Principles of Semantic Networks: Explorations in the Representation of Knowledge, edited by John Sowa, 1990).

Ronald J. Brachman et al., *Living with Classic: When and How to Use KL–ONE–Like Language*, Principles of Semantic Networks (1990).

* cited by examiner

*Primary Examiner*—Diane D. Mizrahi
(74) *Attorney, Agent, or Firm*—Kenyon & Kenyon (57) ABSTRACT

The present mechanism relates to a system and method for maintaining a knowledge base and an evidence set derived from the knowledge base. The knowledge base has a relationship, which exists between a a first object and a second object. A request is specified, the knowledge base is modified in accordance with the request and the relationship, and an evidence set is derived from the knowledge base.

14 Claims, 4 Drawing Sheets

```
$CONTROL : 1
TECHNOLOGY <ACCRUE>
*APPLICATIONS-SERVICES/CONTENT <ACCRUE>
*PHYSICAL-NETWORK-AND-ACCESS <ACCRUE>
*PLATFORM-SERVICES <ACCRUE>
*TECHNOLOGIES-TOOLS-AND-LANGUAGES <ACCRUE>
*ACCESS-DEVICES <ACCRUE>
**INTERNET-TELEVISION <ACCRUE>
**NETWORK-COMPUTERS <ACCRUE>
**SMARTPHONE <ACCRUE>
***0.50"JAVAPHONE"
**PDA <ACCRUE>
***0.80"PERSONAL DIGITAL ASSISTANT"
***0.50"POCKET DEVICE"
***0.80"HANDHELD COMPUTER"
$$
```

| SEARCH PARAMETERS | | | | | | |
|---|---|---|---|---|---|---|
| SEARCH QUERY | TIME STAMP | MATCHING DOCUMENTS | ACCESSED DOCUMENTS | SOURCE INDICATOR | NO. OF MATCHING DOCUMENTS | NO. OF ACCESSED DOCUMENTS |
| "PDA" | 02/01/1997 1:34 P.M. | DOCUMENT 1 DOCUMENT 2 DOCUMENT 3 | DOCUMENT 1 | USER 1 | 3 | 1 |
| "NEWTON" or "PALM PILOT" | 09/13/1999 10:12 A.M. | DOCUMENT 1 DOCUMENT 3 | DOCUMENT 3 | USER 2 | 2 | 1 |
| "PDA" | 09/12/1999 10:14 A.M. | DOCUMENT 1 DOCUMENT 2 DOCUMENT 3 | DOCUMENT 3 DOCUMENT 1 | USER 3 | 3 | 2 |

FIG. 5

SYSTEM AND METHOD FOR MAINTAINING A KNOWLEDGE BASE AND EVIDENCE SET

CROSS-REFERENCE TO RELATED PATENT APPLICATION

This patent application is a divisional application of Ser. No. 09/102,751, filed Jun. 23, 1998; now U.S. Pat. No. 6,255,627 which claims the benefit of U.S. Provisional Application No. 60/051965 entitled Exploiting Knowledge in Online Search Interfaces, filed on Jul. 8, 1997, U.S. Provisional Application No. 60/088224 entitled System and Method for Maintaining a Knowledge Base, filed on Jun. 5, 1998, and U.S. Provisional Application No. 60/074,780 entitled Knowledge-Based Search in Practice, filed Feb. 17, 1998, all of which are incorporated herein by reference.

BACKGROUND OF THE INVENTION

The present invention is directed to a method and system for maintaining a knowledge base and evidence set.

The field of search engines is known. Known search engines include those developed by Verity, Inc., AltaVista, and Lycos. By implementing a search engine, a user can express with precision a focussed area of interest in order to retrieve needed information. Typically, a search engine retrieves documents satisfying the exact terms in a search query. For example, if the search query includes the term "PDA," the search will not retrieve occurrences of "personal digital assistant," "pocket device," or other related terms. This produces under-inclusive results, meaning that documents containing relevant information are not retrieved. Often, however, it is difficult for a user to formulate a query capable of producing appropriately-inclusive results without existing knowledge of a subject area. This difficulty is especially prevalent when a lay user searches in subject areas containing technical terminology or jargon, which is unfamiliar to the lay user. For instance, when searching in the subject area of medical terminology, the lay user is more likely to employ everyday names for terms rather than the technical terms used by medical professionals. Even medical professionals may have difficulty in correctly spelling or recalling a proper medical term. Under-inclusive results also occur when relatively inexperienced users attempt to use search engines. For example, inexperienced users may fail to appreciate that certain search engines are case sensitive or require specific syntax.

Three approaches have been adopted to address under-inclusive results. The first approach employs manual query expansion. As noted above, if a search query is "PDA," the search will not retrieve occurrences of "personal digital assistant," "pocket device," or other related terms. Users familiar with these related terms may manually expand the query by substituting "PDA" in the search query with "'PDA' OR 'personal digital assistant' OR 'pocket device'". This query uses the logical OR operator and would retrieve those documents containing at least one of these terms. Manual query expansion, however, requires user knowledge of related terms. In addition, manual query expansion requires excessive user input. For instance, if a user manually expands the same query term and wished to repeatedly conduct the search, the user must reenter the same related terms each time the query is submitted. Finally, users must have working knowledge of the search engine syntax and the vocabulary of the subject matter that is being searched.

The second approach to address under-inclusive results employs meta tagging. To implement meta tagging, the author of a document inserts metadata, also known as metainformation, into the contents of document itself or otherwise associates it with the document. Metadata is data that describes other data. For example, an author of a web page on the Internet's World Wide Web may insert meta tags into the source code of the web page. Typically, the meta tag is invisible to those viewing the web page with a traditional browser, such as Netscape Navigator, but is present in the source code and visible to search engines. Meta tags are usually words and phrases, which are related to the content of the web page, but do not exist in the text of the web page visible to the user. For example, when a search engine searches for "PDA" on the World Wide Web, the search engine retrieves documents containing "PDA," if "PDA" is either in the meta tag or the contents of the document. One disadvantage to meta tagging, however, is the time investment required by authors to insert meta tags in each document. Moreover, once a document is created, it is time-consuming to modify the meta tags; each document must be reopened to edit the meta tags. Also, since meta tag information is inserted into each document there is an increased likelihood of a data entry error in the spelling or format of the meta tag information. In addition, the meta tag vocabulary might change, thus requiring a modification to all documents containing the meta tag information. Yet another disadvantage is that an individual inserting the meta tags must be taught the vocabulary relating to the content of the document. Finally, meta tagging requires knowledge of the content of the document. In many instances the author of a web page is a web page developer, who is developing the web page for others who are familiar with the content. Thus, meta tagging often requires coordination between a web page developer and those familiar with the content of the web page.

The third approach to address under-inclusive results employs evidence sets. An evidence set contains evidence, which constitute phrases or terms. The evidence is organized into topics. This knowledge is organized, typically in a hierarchical structure or taxonomy, and made available as a shared resource to users. An evidence set is employed by an application, such as a search engine, by incorporating knowledge about topics and associated phrases. One company, Sageware, Inc., has developed a number of KnowledgeSets, which are functionally similar to evidence sets, for specific subject areas. See SAGEWARE, INC., Our Products: Sageware KnowledgeSets (accessed on Mar. 21, 1998; copyright 1997). One use of evidence sets is for query expansion. In contrast to manual query expansion, query expansion with evidence sets does not require a manual substitution of related terms for each query. Rather, the search engine may access the contents of the evidence set to automatically expand the search query.

Known methods for creating evidence sets require extensive user input. Other methods for learning evidence sets exist, however, it is known that evidence sets generated with learning algorithms on training data typically produce inferior quality evidence sets. In addition, known methods for creating evidence sets often produce evidence sets that are difficult to modify. Typically, methods for creating evidence sets include the use of either a standard text editor or a graphical user interface (GUI). An evidence set may be created with a text editor by inputting text and symbols in accordance with a known evidence set format. As evidence sets generally require a specific syntax, text editor creation has the disadvantage that minor inadvertent input errors may create an improperly formatted or non-working evidence set. For instance, a misplaced symbol or term may inadvertently change the relationship between evidences or topics in an evidence set. Because the syntax of evidence sets is often cumbersome, a user cannot readily apprehend when mistakes have occurred. Moreover, once an evidence set has been created with a text editor, can be relatively difficult to modify its structure. A text-edited modification requires reentry of evidences in the evidence set to comport with the newly-modified structure. Also, modifying an evidence set with a text editor requires a user with working knowledge of the syntax of the evidence set. In addition, a user may create an inconsistent evidence set. For instance, a user may create a text-edited evidence set with multiple occurrences of the same topic. Moreover, using a text editor to create an evidence set, each topic may have a different set of evidences. This could create an internal inconsistency in the evidence set and result in an evidence set that is non-functioning or, at the very least, capable of producing inconsistent results. Finally, when making changes to a textedited evidence set, a regression test must often be performed to fully understand the impact of changes to the evidence set.

A second known method for creating evidence sets employs GUIs. Such a method, developed by Verity, Inc., is topicEditor. VERITY, INC., Introduction to Topics Guide V2.0 (copyrighted Sep. 23, 1996; visited Mar. 21, 1998) discloses the use of topicEditor. In topicEditor users create topics and evidences in a hierarchical GUI environment, which allows users to expand and collapse topics, copy or move topics using drag and drop, and re-use topics by selecting them from a drop-down list. Once a topic is created in topicEditor, a user may generate topic sets, which are functionally similar to evidence sets. These topic sets may be stored in a knowledge base. Typically, these types of knowledge bases only include information that is represented in the GUI environment. For instance, a GUI-created knowledge base typically contains only information that relates to the hierarchical structure of the topics and evidences. Typically, for any given GUI-created knowledge base there exists only one corresponding evidence set. Finally, modification of a GUI-created knowledge base requires excessive manipulation of the GUI environment.

U.S. application Ser. No. 09/054,886 filed by McGuinness et al. and entitled "System and Method for Searching," now U.S. Pat. No. 6,385,600 which is incorporated herein by reference, discloses deriving an evidence set based on a knowledge base.

Often, however, the mere creation of an evidence set and the corresponding knowledge base from which it is derived is insufficient to satisfy the needs of users. Changes to the evidence set may be required to correct errors, modify content information, and add new terms that arise in the content area. For similar reasons, it may be desirable to modify the structure of a knowledge base to improve its structure or to modify information contained within the structure. Thus, once an evidence set is derived from a knowledge base it may be desirable to modify the structure of the evidence set, the knowledge base, or both.

Modification of the evidence set and knowledge base may be accomplished by modifying each independently from the other. For instance, the evidence set may be modified by using the methods for creating an evidence set discussed above. For example, the evidence set may be modified by opening the evidence set as a file in a standard text editor, modifying its syntax and contents in the editor, and saving the file in memory. Similarly, a knowledge base may be modified using the methods for creating a knowledge base that were discussed in U.S. application Ser. No. 09/054,886 now U.S. Pat. No. 6,385,600.

Disadvantages exist when modifying the evidence set and knowledge base independently of each other. First, independent modification requires duplicative actions in both the evidence set and the knowledge base. This requires more user input than is required to modify either the knowledge base or the evidence set alone. Second, there may be separate software tools for modifying independently the evidence set and the knowledge base; thus, requiring the execution of two separate software programs. Third, independent modification allows users to create inconsistencies between a given knowledge base and its corresponding evidence set. For instance, an inconsistency would arise if a user modifies an evidence set by deleting a term and fails to delete the same representation of the term in the corresponding knowledge base. Fourth, independent modification requires a user to understand the syntax of both the knowledge base and the evidence set. This, in turn, also introduces the possibility for input errors in both the modification of the evidence set and modification of the knowledge base.

SUMMARY OF THE INVENTION

The present invention is directed to a method for maintaining a knowledge base and an evidence set derived from the knowledge base. In accordance with the method of the present invention, a request is specified, a knowledge base is modified in accordance with a request and the relationship, and the evidence set is derived based on the knowledge base. The knowledge base includes the relationship existing between a first object and a second object. The evidence set is derived from the knowledge base.

These and other aspects of the invention will be discussed below.

DETAILED DESCRIPTION

In accordance with the system and method of the present invention, a request is specified, a knowledge base is modified in accordance with the request and a relationship of the knowledge base, and an evidence set is derived from the knowledge base.

Before discussing the detailed embodiments of the invention, a brief overview of how the invention may be employed is appropriate. Initially, a knowledge engineer creates a knowledge base. An evidence set may be derived from that knowledge base using methods discussed in U.S. application Ser. No. 09/054,886. The present invention relates to the maintenance of and modifications to an existing knowledge base and its corresponding existing evidence set.

Figure 1:
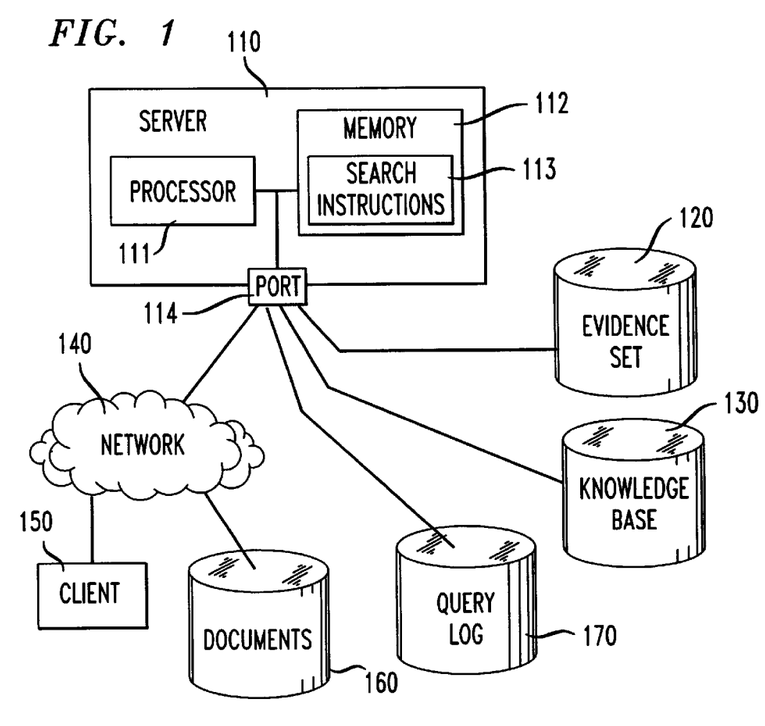
FIG. 1 illustrates in schematic form a network in which the method of the present invention may be implemented.

FIG. 1 shows an environment in which the present invention might be employed. For example, server 110 is a computer. A computer is a functional unit that can perform substantial computation, including numerous operations without human intervention. Server 110 includes a processor 111, memory 112, and port 114. Processor 111 can be any system or mechanism that accepts a program as input, prepares it for execution, and executes the process so defined to produce results. A program is a sequence of instructions suitable for processing by a computer. Memory 112 includes, but is not limited to, any device in which information can be stored. Port 114 is a place of access to a device or network where energy may be supplied or withdrawn or where the device or network variables may be observed or measured. The processor 111 and memory 112 are coupled to each other, and both the processor 111 and memory 112 are coupled to the port 114. Coupled includes joined, associated, linked, bonded, attached, in communication, connected, and affiliated, and is not limited to relationships requiring physical contact or proximity. A portion of the memory 112 includes maintenance instructions 113. The maintenance instructions 113 include instructions to perform the present invention. For the purposes of this discussion, maintenance instructions 113 are not limited to those instructions that perform or execute a search engine. Maintenance instructions 113 are adapted to be executed by the processor. Typically, maintenance instructions 113 are in the form of a program. Maintenance instructions 113 may be stored on a medium. Examples of medium that store instructions include a hard disk, a floppy diskette, a Compact Disc Read Only Memory (CD-ROM), a flash memory, an electrically erasable programmable read-only memory (EEPROM), a tape, and any other device that can store information. As used herein, the phrase "adapted to be executed by a processor" is meant to encompass instructions stored in a compressed and/or encrypted format, as well as instructions that require compilation or installation before execution by a processor.

Server 110 is coupled to a network 140. Network 140 is a plurality of points interconnected by communication channels. Examples of network 140 include local area networks (LAN), wide area networks (WAN), and interconnected networks such as the World Wide Web.

Client 150 is coupled to the network 140. Client 150 is a computer that requests services of the server 110; client 150 may also be another server. Documents 160 are also coupled to the network 140. Documents 160 are records that have permanence and that can be read by man or machine, including files, directories, indexes, strings, tables, cells, codes, Web Pages, and any other information objects. Those skilled in the art understand that the embodiment of FIG. 1 can be modified to couple client 150, documents 160, or both directly to the server 110, rather than via the network 140. Moreover, documents 160 may alternatively be stored on the server 110, the client 150, or both. Those skilled in the art will understand that a search engine typically searches indexes of documents. Rather than searching the contents of the documents for each search, a search engine indexes documents to determine the words, texts, strings, values, and other variables that occur within a document. The index will often contain information relating to the location of the variable within the document and its relation to other variables. For the purposes of this discussion, documents will include both the documents themselves and indexes of documents.

Server 110 is coupled to an evidence set 120, knowledge base 130, and query log 170 via the port 114. It will be understood by those skilled in the art, that this embodiment could also be modified to couple the evidence set 120, the knowledge base 130, the query log 170, to the network. Moreover, the evidence set 120, the knowledge base 130, or the query log 170, could also be stored on the server 110 or on a client 150. In Internet applications, a single evidence set 120 is typically accessed by a plurality of clients (not shown). Accordingly, in many instances it is often desirable to couple the evidence set 120 directly to the server 110 as indicated in FIG. 1.

As will be discussed below, the evidence set 120 is derived from the knowledge base 130, and thus, it is often desirable to couple the knowledge base directly to the to the server 110 via the port 114. The query log 170 stores queries and typically includes queries from a plurality of users. For similar reasons, it may be desirable to couple the query log 170 to the port 114.

Evidence set 120 is a grouping of evidence and topics. Evidence is a phrase. Typically, evidence is the phrase that is searched for. A topic is a grouping of evidence that is related by subject area. Evidences and topics can be created as independent units or as units with relationships to other evidences or topics in a hierarchical structure. Evidence set 120 may be stored as an individual file.

Figure 2:
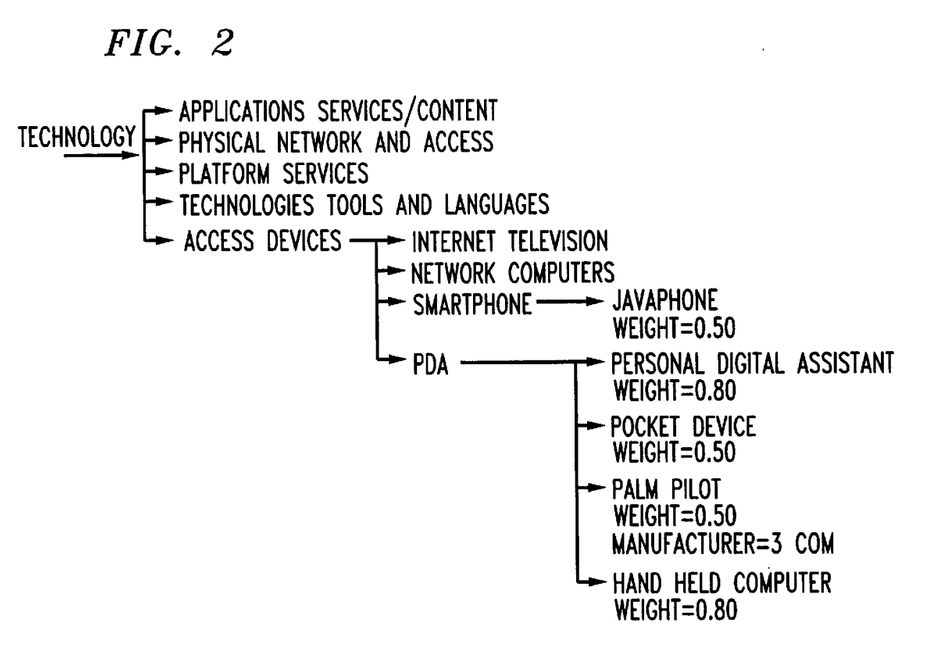
FIG. 2 illustrates the hierarchical structure of both an exemplary evidence set and an exemplary knowledge base from which the exemplary evidence set is derived.

FIG. 2 illustrates an exemplary hierarchical structure of both an evidence set 120 relating to technology and a knowledge base 130 from which the evidence set 120 is derived. Evidence set 120 may include the top-level topics such as "access devices," "application services/content," "physical network and access," "platform services," and "technologies tools and languages." The top-level topic "access devices" may include subtopics "pda," "internet television," "network computers," and "smartphone." The evidence for "PDA" could include the terms "personal digital assistant," "pocket device," "palm pilot," and "pda." The evidence for "smart phone" could include the single term "javaphone." For the purposes of this discussion, evidences include top-level topics, subtopics, and evidences. For "palm pilot," a manufacturer role is shown to be filled with "3 Corn." This indicates that 3 Corn is the manufacturer of the Palm Pilot.

Figure 3:
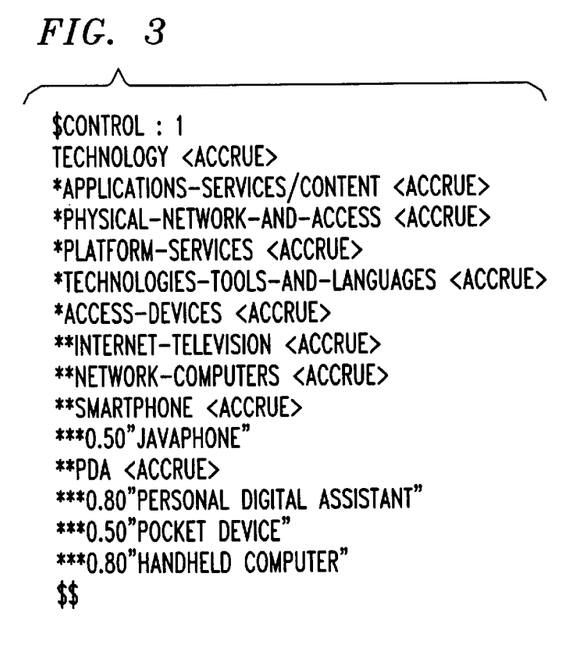
FIG. 3 provides an exemplary syntactical file format for the exemplary evidence set illustrated in FIG. 2.

FIG. 3 illustrates one possible format for the evidence set structure shown in FIG. 2. It will be understood by those skilled in the art that several other formats -whether or not presently existing—may be used to create the evidence set 120. Typically, the format comports with the syntax established by the developer of the search engine. One such format is described in VERITY, INC., Introduction to Topics Guide V2.0 (copyrighted Sep. 23, 1996; visited Mar. 21, 1998).

Using conventions employed by Verity, a topic outline file is finctionally similar to an evidence set 120. A topic outline file is an ASCII text file, which is structured in a format that contains topic definitions. The term "<Accrue>" represents an operator that selects documents that include at least one of the search elements specified. An asterisk symbol indicates the hierarchical level of the topic. For instance, "palm pilot" is evidence for "pda," which is a subtopic of "access-device," which is a subtopic of "technology." The term "0.80" before "palm pilot" is a weight assignment, which effects the degree of relevance a term is given in the computation of a score, or importance rating, of a document. The score is calculated by taking into account the weight of each term. By convention, a document with a high score suggests greater relevancy. It will be understood to those skilled in the art and familiar with Verity's topicEditor that evidence set 120 may be constructed with other operators and/or modifiers, which are described in the above-listed Verity reference. These weights are also stored in the knowledge base 130, as indicated in FIG. 2.

Knowledge base 130 is a collection of interrelated information, facts, and/or statements. The knowledge base 130 contains strictly more information that is contained in the evidence set 120. Knowledge base 130 can be based on several types of relationships, including description logic and rule-based relationships. A relationship is a directed connection between two or more items or attributes. Each class may include an object. Typically, knowledge base 130 is stored as a record in a structured format. Knowledge base 130 includes a first class. A class may include the root class of the knowledge base, or the class describing all information in the knowledge base. It should be noted that the knowledge base 130 does not have to be rooted in a single class. If the structure of FIG. 2 were expressed as a knowledge base 130, for instance, the root class would be "technology." A class is defined to include both traditional classes and metaclasses. Typically, classes are expressed in a core language and metaclasses are expressed in a metalanguage, which is generally more expressive than the core language. Metaclasses are classes that describe another class. Examples of information that is appropriate for metaclasses include subjective comments, details of how to present information, authorship, visibility, non-subject based information, and annotations. Authorship is information that defines, describes, and/or relates to the author of a record. Authorship can be a role. Visibility is information that determines whether information will be visible or invisible to users using the evidence set and/or search interface. Visibility can be either a role or a class. If information is invisible it will not be included in the evidence set 120 but it will be maintained in the knowledge base 130. This has the advantage of simplifying an evidence set 120 that contains a complex structure or a large number of terms. In addition, it may be undesirable for privacy or security reasons to display the entire evidence set 120 to every user. Those skilled in the art will understand that certain information may be expressed as either a class or a metaclass.

A knowledge base 130 may also contain necessary and/or sufficient conditions. A condition is necessary when it is required to be a member of a class, but does not satisfy a class by itself. For example, a mammal is a person, but just because something is a mammal does not necessarily mean it is a person. A condition is sufficient for a class if when an individual satisfies a condition, then it must be a member of the class. For example, the condition "at least one employer" is a sufficient condition for the class "employed" since any object that has at least one employer must be a member of the class "employed."

It should be noted that Verity's topicEditor uses the term "knowledge base," as a grouping of topics or concepts. For the purposes of this discussion, knowledge base 130 is not limited to those knowledge bases that contain topics and evidence. Rather, knowledge base 130 as defined herein includes, but is not limited to, as grouping of other information such as role information and metainformation. One example of a role is a visibility role, which determines if an object should be included as a term in an evidence set. For example, a knowledge base 130 may include internal product designations, such as model or version number. In certain instances, it may be desirable to maintain this information in the knowledge base 130, but not include the information in the evidence set 120. For instance, one may limit the derivation of an evidence set to include those topics and evidences that satisfy an internal product designations role. It may be determined, however, that these internal product designations should not be included in the evidence set 120 itself. For instance, the internal product designations would not exist in documents outside of the company, and their use in searches of documents outside the company would not add to the search. Thus, the internal product codes would be invisible to the evidence set 120. In another aspect, the visibility may be used to limit the access of the internal product codes to a certain set of users. For instance, a visibility role may be used to define internal product designations visible for those using an evidence set 120 inside the company and invisible to those using an evidence set 120 outside the company.

In addition, the knowledge base 130 of the present invention is more expressive than the knowledge base of Verity's topicEditor. The knowledge base 130 of FIG. 2 may include, for example, the manufacturer of a product. A knowledge base 130 can include any description logic expression and/or frame-oriented expression. For instance, the manufacturer role of "palm pilot" is filled by "3 Com," the manufacturer of the Palm Pilot. The manufacturer, "3 Com," might be included as evidence when it can be determined from the knowledge base that "3 Com" only manufacturers one product or one type of product. On the other hand, if it is determined from the knowledge base 130 that "3 Com" fills the manufacturer role for several products (some of which may not be PDA's), then when deriving the evidence set 120 it may be decided that "3 Com" should not be added as evidence to "pda." This is because adding "3 Com" as evidence to "pda" would produce over-inclusive search results. Thus, the knowledge base 130 of the instant invention is more expressive than the knowledge base of Verity's topicEditor.

In cases where the knowledge base 130 is based on description logic relationships, a description logic relationship exists between two classes and/or between a class and an object. The field of description logics, also sometimes referred to terminological logics, structured inheritance networks, and KL-ONE like systems by those skilled in the art. Description logics provide a formal syntax and semantics for expressing and reasoning with descriptions.

Description logic relationships express knowledge about concepts in concept hierarchies. Typically description logic relationships are implemented with description logic languages. They are usually given a Tarski-style declarative semantics, which allows them to be seen as sub-languages of predicate logic. Starting with primitive concepts and roles, language constructs (such as intersection, union, role qualification, etc.) are employed to define new concepts and roles. Concepts can be considered as unary predicates which are interpreted as sets of individuals whereas roles are binary predicates which are interpreted as binary relations between individuals. Roles in some description logics may take more than two arguments, i.e., they may relate three or more individuals to each other. The main reasoning tasks are classification and subsumption checking. Subsumption represents the "is-a" relation. A whole family of knowledge representation systems has been built using these languages and for most of them complexity results for the subsumption algorithm are known. Description logic systems have been used for building a variety of applications including software management systems, planning systems, configuration systems, and natural language understanding. Description logic systems are discussed in the following references: Ramesh S. Patil et al., The DARPA Knowledge Sharing Effort: Progress Report, KR'92 PRINCIPLES OF KNOWLEDGE REPRESENTATION AND REASONING, PROCEEDINGS OF THE THIRD INTERNATIONAL CON- FERENCE (Oct. 25, 1992) and Peter F. Patel-Schneider and Bill Swartout, Description-Logic Knowledge Representation System Specification from the KRSS Group of the ARPA Knowledge Sharing Effort (Nov. 1, 1993) and Robert MacGregor, The Evolving Technology of Classification-based Knowledge Representation Systems (in Principles of Semantic Networks: Explorations in the Representation of Knowledge, edited by John Sowa, 1990). Description logics are also discussed in the following reference, which is incorporated herein by reference: U.S. Pat. No. 5,720,008 issued to McGuinness et al.

An example of a description logic language is CLASSIC, developed by AT&T Bell Laboratories. See Ronald J. Brachman et al., Living with CLASSIC: When and How to Use a KL-ONE-Like Language, Principles of Semantic Networks (1990). CLASSIC stands for "CLASSification of Individuals and Concepts." It has complete implementation in COMMON LISP, C, and C++. CLASSIC is a description logic-based knowledge representation system that follows a paradigm originally set out by the KL-ONE system; it concentrates on the definition of structured concepts, their organization into taxonomies, the creation and manipulation of individual instances of such concepts, and the key inferences of subsumption and classification.

The formulation of knowledge base 130 based on description logic relationships will be well understood by those skilled in the art. Equally understood by those skilled in the art is the implementation of specific description logic languages, such as CLASSIC. Nevertheless, a general description of the advantages of a knowledge base based on description logic relationships is appropriate. Description logic relationships provide a convenient representation for reasoning with hierarchies. In addition, description logics support certain classes of inference and contradiction detection for modification of existing knowledge bases. Description logics are especially powerful when relationships exist between objects, such as companies that make products in particular topic areas, and when those relationships may be interesting to query or to restrict. Thus, in a system built with a deeper knowledge component, one can choose only to use single product companies as evidence for a topic but then later retrieve all the companies that make products in a particular category and find the multiple product companies as well. This allows knowledge to be maintained in a single viewable modifiable storage place. Knowledge can be pruned appropriately to make evidence sets for specific purposes.

The knowledge base 130 may be based on several types of relationships including description logic and rule-based relationships. In such instances a rule-based relationship exists between two class expressions. A class expression is a definition of a class, which may or may not be named.

In the case of description logic relationships, the knowledge base 130 may be generated with a known description logic language, such as CLASSIC. Of course, it will be understood by those skilled irr the art that the generation of a knowledge base 130 based on description logic relationship is in no way limited to implementation in CLASSIC. Nevertheless, the advantages of a knowledge base 130 based on description logic relationships may become clearer with a brief description of CLASSIC.

CLASSIC provides for concepts, roles, individuals, and rules. Concepts are descriptions with potentially complex structure, formed by composing a limited set of description-forming operators. Concepts correspond to one-place predicates, and thus, can be applied only to one individual at a time. Roles are simple formal terms for properties. Roles correspond to two-place predicates, and are used to relate two individuals at a time. Roles that must be filled by no more than one individual are called attributes. For the purpose of this discussion, a class is a description of an object, and it may include concepts, roles, and attributes.

Individuals are formal constructs that directly represent objects in the domain of interest. Individuals are often given properties by asserting that they satisfy concepts and that their roles are filled by other individuals. For the purpose of this discussion, an object includes individuals.

Rules associate one class description with another class description.

Concepts and individuals are placed into a taxonomy, or hierarchy. A more general concept will be above a more specific concept in the taxonomy. For example, if there were a concept for "a PDA developed by Company A and Company B," then this would be a more specific concept than "a PDA developed by at least one company," because the first concept describes PDAs developed by at least two companies. In the taxonomy, individuals are underneath all the concepts that they satisfy. For example, the individual "JavaPhone," which is a type of access device, would be under the concept "ACCESS-DEVICES" in the taxonomy. To maintain this taxonomy, CLASSIC also determines the derivable properties of all individuals and concepts—inheriting properties from more-general descriptions as well as combining properties as appropriate.

CLASSIC also provides for a number of deductive inferences including completion, classification and subsumption, and rule application. With completion, logical consequences of assertions about individuals and descriptions of concepts are computed.

In CLASSIC, completion inferences include, among others, inheritance, combination, propagation, contradiction detection, and incoherent concept detection. With inheritance, restrictions that apply to instances of a concept must also apply to instances of specializations of that concept. In a sense, properties are "inherited" by more specific concepts from those that they specialize. With combination, restrictions on concepts and descriptions may be logically combined to make narrower restrictions. With propagation, when an assertion is made about an individual, it may hold logical consequences for some other related individual. For example, if it is known that everything that fills a manufacturer role on a particular individual "palm pilot" is a company and it is later asserted that "3 Com" fills the manufacturer role on the individual "palm pilot," then "3 Com" is derived to be a company. The logical consequence "propagates" forward when this assertion is made. With contradiction detection, it is possible to detect when two or more facts about an individual are logically impossible to conjoin together. With incoherent concept detection, an assigmnent of a restriction to a concept that produces a logical impossibility is detected.

Classification and subsumption inferences include concept classification, individual classification, and subsumption. With concept classification, all concepts provably more general than a concept and all concepts provably more specific than a concept are found. With individual classification, all concepts that an individual provably satisfies are determined. With subsumption, questions about whether or not one concept is more general than another concept are resolved.

Rule application inferences apply simple forward-chaining rules, which have concept descriptions as antecedents and consequents. When an individual is determined to satisfy the antecedent of a rule, is asserted to satisfy the consequent as well. CLASSIC also includes operators, which are used to form conjunctions, role restrictions, test restrictions, enumerated concepts, and primitive and disjoint primitive concepts.

In the case of a rule based knowledge base, a rule based relationship exists between the first class and the second class. One concept may be related to another concept by a rule. For example, all people—in the United States—may be known to be instances of things with a Social Security number. It is possible for evidence sets for people may also use the social security number of the person if it is known. Thus, given a rule connecting person to exactly one social security number; the evidence set could use the social security number if the social security role was filled.

Figure 4A:
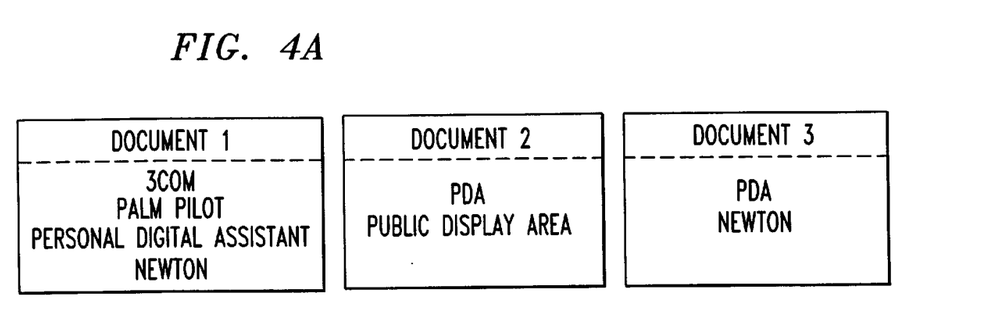
FIG. 4A provides the contents of three exemplary documents.
Figure 4B:
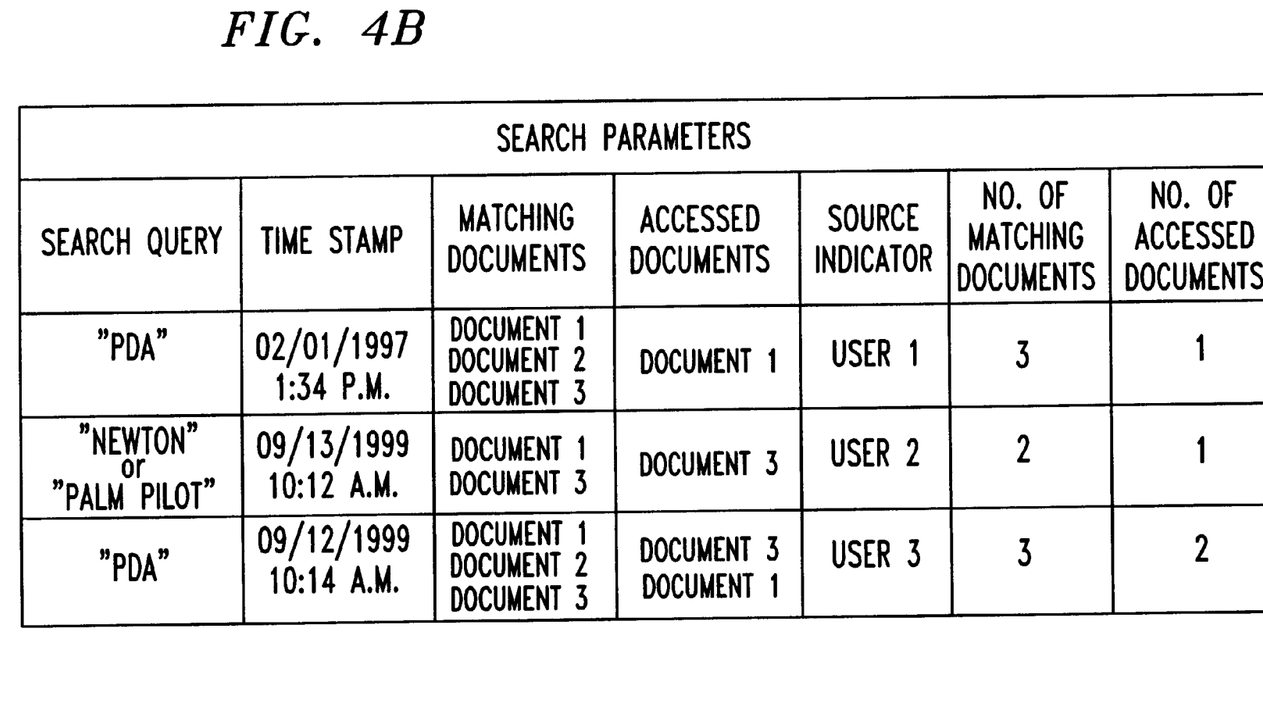
FIG. 4B provides an exemplary structure of a query log that corresponds to the three exemplary documents provided in FIG. 4A.

Query log 170 may include a number of query log parameters, each of which relates to the query. As illustrated in FIG. 4B, query log parameters may include the search query, a time stamp, matching documents, accessed documents, a source indicator, the number of matching documents, and the number of accessed documents. Here, the term time stamp includes any information that records the time, date, or other temporal measurement of the query. As illustrated in FIG. 4B, a time stamp may be a combination of date and time, although either date or time would be sufficient. The term "matching documents" includes those documents that satisfied the search query. The matching document parameter may include any one or more of the following: an indicator, such as a name, title, or address for a matching document; the order in which the matching documents were retrieved by the search engine (for instance, several search engines order the matching documents according to relevance); and the size of the matching document. The term "accessed documents" are those documents that a user retrieves for viewing or other modes of presentation. The same information that relates to matching documents may also be stored with respect to accessed documents. The term "source indicator" is information that identifies the source of the search query. This may be a user identification, sometimes known as a log in i.d., or it may be an internet protocol (IP) address from which the user is accessing the search engine. FIGS. 4A–4B illustrate an exemplary structure of a query log 170 and three exemplary documents, labeled Document 1, Document 2, and Document 3, respectively. The query log 170 is represented in FIG. 4B as a table of data records, although those skilled in the art will understand that other data structures may be implemented. The query log 170 of FIG. 4B is organized into rows. Each row stores a "query" and its associated "search results" and "accessed documents." Each of these three categories of data constitutes a row. Those skilled in the art will understand that a search query parameter is not limited to the categories of information disclosed in FIGS. 4A–4B, and a search query parameter may be any type of information that relates to a search query.

Figure 5:
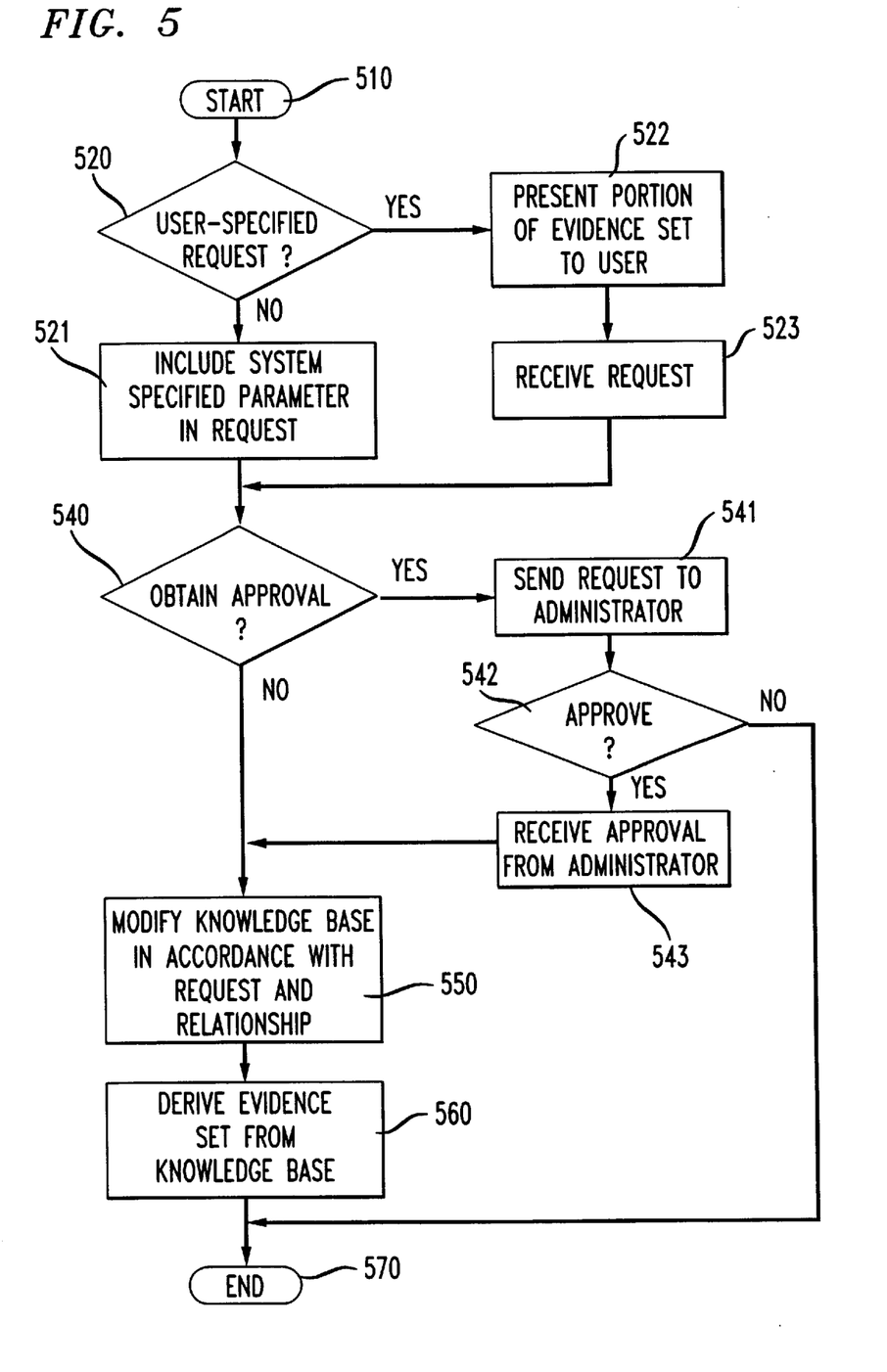
FIG. 5 provides a flowchart describing a process in accordance with a method of the present invention.

In accordance with a process shown in the flowchart of FIG. 5, the present invention is directed to a system and method for maintaining a knowledge base and evidence set. For the purposes of this discussion, it will be understood that the process can also be performed entirely on a stand-alone computer, such as a single client or single server. For example, the process may be implemented to maintain a knowledge base 130 and evidence set 120 on a stand-alone computer.

The process of FIG. 5 starts at step 510. The process presupposes that the evidence set 120 is initially derived from the knowledge base 130. The initial derivation of an evidence set 120 from the knowledge base 130 is discussed in detail in U.S. application Ser. No. 09/054,886 now U.S. Pat. No. 6,385,600. Generally, it will be understood by those skilled in the art that the process of FIG. 5 is not restricted to the order of the steps as shown and may be modified to change the order of the steps in certain instances. In addition, those skilled in the art will understand that not all steps of the process of FIG. 5 are required to practice the invention.

In step 520, the server 110 executing the maintenance instructions 113 determines if a user-specified request will be implemented. This determination may be made by a variety of methods including receiving input from the user or receiving system-specified instructions. For the purposes of this application, a request is a set of parameters to modify the evidence set 120, the knowledge base 130, or both. For example, a user may submit a request to add, delete, or modify the contents and/or structure of the evidence set 120, the knowledge base 130, or both. Referring to FIG. 2, for example, the user may submit a request to delete "internet television" as a subtopic of the topic "access device." Alternatively, a user may submit a request to move "network computers" from the topic "access devices" to the topic "physical network and access." Another request may consist of modifying the manufacturer role of the "palm pilot" from "3 Com" to "US Robotics." Requests may also be used to modify the weights assigned to the individual terms in the evidence set 120. As will be discussed below, the present invention also has implications to the structure of the knowledge base 130. Those skilled in the art will understand that requests may include several other modifications to either the knowledge base 130, the evidence set 120, or both.

If a user-specified request is used, a portion of the evidence set 120 may be presented to the user, step 522. Presenting includes the representation of data or information in a graphical, visual, aural, audio, tactile, or other sensory medium or mode. Presentation of a portion of the evidence set 120 enables the user to formulate a request. The presentation may take a variety of forms. In one method of presenting the evidence set 120, the user is shown a graphical user interface (GUI), which is similar to the evidence set structure of FIG. 2. The levels of the taxonomy—including the topics and terms—can be added, deleted, copied, pasted, or modified in a manner similar to the Microsoft File Manager (copyrighted 1991–1996).

Those skilled in the art will understand that this presenting step is not required to practice the instant invention. For instance, a user may submit a request without specific knowledge of either the evidence set 120 or the knowledge base 130 if the structure of the evidence set 120 and corresponding knowledge base 130 is relatively simple in structure.

The request may also include a command. A command is a symbol or representation for a set of instructions or tasks. Typical commands include, but are not limited to, ADD, DELETE, MOVE, COPY, and FILL. For instance, the phrase "DELETE "internet television"" would delete the topic "internet television." Moreover, the phrase "FILL "palm pilot" manufacturer=AT&T" may be used to fill the manufacturer role of "palm pilot" of FIG. 2 to be "AT&T." One interface supporting command input is a GUI. Those skilled in the art will understand that other interfaces, such as a command line interface used in DOS or UNIX, may also be employed.

The request may also include an operation having a term descriptor and an operator. The term descriptor may include a topic or term. It should be noted that the term "descriptor," includes classes. The operator is a symbol that represents an action to be performed in an operation. An operation is an action specified by one or more operands. An operand is a variable, constant, or function upon which an operation is to be performed. For instance, the request may include the phrase "IF manufacturer=empty THEN FILL manufacturer= AT&T." Examples of operator categories include the following: boolean, grammatical, proximity, relational, concept, or any other operator defined by a description logic language such as CLASSIC. Examples of operators include IF, AND, OR, NOT, and ALL. Examples of grammatical operators include PHRASE, SENTENCE, or PARAGRAPH. For instance, the query "A PARAGRAPH B" will locate all records where A and B are within the same paragraph. Employing these commands, adding (all manufacturer COMPANY) to a high level concept (such as "technology") would automatically cause all fillers of any manufacturer role on any instance of "technology" to be instances of COMPANY.

The user may also submit an entire modified evidence set 120 as the request. For instance, the user may modify the evidence set 120 by opening the evidence set 120 in a standard text editor and modifying its text. Alternatively, the evidence set 120 may be modified with a GUI similar to one discussed in U.S. application Ser. No. 09/054,886. When the evidence set 120 serves as the request, the knowledge base 130 is derived to comport with the structure of the newly modified evidence set 120.

In step 523, the request is received from the user.

If the server 110 determines that user-specified requests will not be used, the request includes at least one system-specified parameter. A system specified parameter is information that permits the evidence set 120 and/or knowledge base 130 to be maintained without any input or selection by the user. The system-specified parameter may be generated by the server executing the maintenance instructions 113. In addition to or alternatively, the system-specified parameter may be stored in the memory 113. For instance, as illustrated in FIGS. 2 and 3, a knowledge base 130 and corresponding evidence set 120 may relate to technologies and consist of terms and topics in the English language. A system-specified request may consist of converting each term and phrase in the evidence set into its French equivalent. Such a system-specified request may be specified by the maintenance instructions 113 when it is determined that the evidence set 120 will be used to search documents containing French or when being implemented by a user whose native language is French. Those skilled in the art will understand that other system-specified parameters may be implemented in the instant invention. Moreover, system-specified parameters may be combined with a request submitted by the user.

The information stored in the query log 170 may be used to identify relationships between each of the query log parameters. For instance, referring to FIGS. 4A–B, "PDA" was the search query for both the first and third entry. As both search queries searched the same three documents, Document 1, Document 2, and Document 3, they both retrieved the same matching documents in the same order (presumably the same search engine was used, although this is not necessarily required). It should be noted, however, that user 1 performed the first query and user 2 performed the second query. Moreover, user 1 only accessed Document 1. User 2, on the other hand, first accessed Document 3 and then Document 1. One conclusion that may be reached by this example is that Document 2 is not as desirable for the types of searches performed on this database. One possible explanation is that "pda" is apparently defined as "public display area," an alternate meaning of the acronym "pda" that was used in Document 1 and Document 3. Thus, a relationship may be formed that excludes the term "public display area" from any occurrences of "pda." This relationship may be used to formulate the request. In this way, the query log 170 may be used in an agent-like style to notify the knowledge base administrator of possible additions that should be made to the knowledge base 130.

The information stored in the query log 170 may also be used to further relax or restrict the query. For instance, if a number of matching documents is undesirably low, it may be desirable to relax the query by substituting a broader term than the term that existed in the original query. By taking advantage of the hierarchical structure of the evidence set 120 and knowledge base 130, a term in a query may be substituted with evidence or a topic that is above the term in the evidence set. For instance, if a user submits a query for "internet television with at least 2 manufacturers," we may obtain an undesirably low number of matching documents. To relax the query the server may submit—or alternatively propose to the user—a number of relaxed queries to the user. For instance, the following queries would be less restrictive than the initial query:

access devices with at least 2 manufacturers;

internet television with at least 1 manufacturer; or access devices with at least 1 manufacturer.

Each of the three listed queries are less restrictive than the initial query. The first query takes advantage of the parent-child relationship between topics, subtopics, and evidences. The second query relaxes a query restriction—in this case the number of manufacturers. The third query combines both methods to relax a query.

The information in a query log 170 may also be used to store queries and notify users of new documents that have been added to the collection of documents and that further satisfy the query. By storing the query in the query log 170, the queries may be submitted to the new documents. This may be done when the new document is added to the collection, or alternatively, periodically to reduce the amount of computing time.

When restricting queries, however, it may be useful to first present the possible child topics to a user. The user than can then select the child topic that is most relevant to the search that he is performing. This added step of presenting the child topics to the user is often necessary when restricting because, unlike a child that usually has only one parent, a parent does not usually have only one child.

In step 540, the server 110 executing the maintenance instructions 113 determines if administrator approval is required. This may be determined by receiving input from the user or an administrator. An administrator is an entity—including, but not limited to, a person or an artificial intelligence (AI) system—that oversees the information in the knowledge base 130 and the evidence set 120. Typically, administrators are entities with knowledge and/or understanding of the knowledge base 130. Administrators may also-have an understanding of the content or subject matter of the knowledge base 130 and the evidence set 120.

Approval may be desirable when users, from whom requests are received in step 524, have little or no familiarity with the proper construction and/or content of a knowledge base 130 or evidence set 120. For instance, referring to FIGS. 2 and 3, a user may attempt to add the topic "access device" under the topic "internet television." This would create an internal inconsistency since the topic "access device" may be a child or parent of another class (such as "internet television"), but not both. This kind of modification is not permitted in the interface. Another type of modification that is allowed would be to add "internet television" under one of its siblings, such as "PDA." In certain embodiments, the user would receive a waning message stating that the concept is already in the hierarchy and asking for user confirmation before proceeding. In most cases, however, such changes may require additional approval from the administrator before updating the knowledge base 130 and evidence set 120.

If approval is required in step 540, a request is sent to the administrator, step 541. The administrator may receive this request at the server 110, the client 150, or at any other point on the network 140.

In step 542, if the administrator denies the request, the process is terminated in step 570. On the other hand, if the administrator approves the request in step 542, the server receives the approval in step 543. Those skilled in the art will understand that requests could be batched.

In certain instances administrator approval will not be required in step 540. An instance where a lack of administrator approval may be appropriate include when the user is known to have a sufficient understanding of both the content and structure of the knowledge base 130 and evidence set 120. In addition, not requiring administrator approval may be appropriate when the request is limited to system-specified parameter. Typically, certain system-specified parameters may be constructed to avoid creating internal inconsistencies within the knowledge base 130 and/or the evidence set 120.

In step 550, the knowledge base 130 is modified in accordance with the request and a relationship included in the knowledge base 130. As discussed above, the knowledge base 130 includes at least one relationship existing between a first object and a second object. Here, the term "object" includes classes. The knowledge base 130 is modified to satisfy both the request and the existing relationships in the knowledge base.

If the request is directed to the structure of the knowledge base 130 itself, then the modification occurs directly. In certain instances, however, the request is directed to aspects of the evidence set. For instance, as noted above, the request may include an entire evidence set 120, which has been modified by the user. In such cases, a reverse translator translates the evidence set 120, which has been modified and which serves as the request, to generate a knowledge base 130.

As noted earlier, an evidence set 120 is a proper subset of its corresponding knowledge base 130. This is because the knowledge base 130 may contain relationship information that is not always expressed in the evidence set 120. Thus, the evidence set 120 typically contains less content information than the knowledge base 130. As noted in U.S. application Ser. No. 09/054,886, an evidence set 120 may be derived from a knowledge base 130 by implementing a translator. A translator takes the information in a knowledge base 130 and coverts it into the syntax of an evidence set 120. A reverse translator is capable of deriving a knowledge base 130 based on an evidence set 120. A reverse translator must maintain additional information in order to regenerate the complete knowledge base 130 from an evidence set 120. For instance, if a user-selected evidence set represents only those topics and evidences below "access devices" in the taxonomy of FIG. 2, it would be impossible to reconstruct a complete knowledge base 130 with a reverse translator based solely on the information of the pruned evidence set 120.

In step 560, the evidence set 120 is derived from the knowledge base 130, which has been modified. As noted in U.S. application Ser. No. 09/054,886, one method for deriving the evidence set 120 from the knowledge base 130 involves the use of a translator.

In step 570, the process of FIG. 5 ends.

Thus, the process of FIG. 5 results in a modified knowledge base 130 and corresponding evidence set 120, both of which contain are consistent with each other. Those skilled in the art will understand that the present invention has advantages to the independent maintenance of a knowledge base 130 and an evidence set 120. For instance, the knowledge base 130 and evidence set 120—when modified through the system and method of the instant invention—will be syntactically correct. Moreover, the possibility of semantic errors will be minimized if not eliminated. Other semantically questionable modifications (such as adding a topic under one of its sibling classes) will be brought to the attention of the administrator. Finally, many evidence sets 120 may be generated by one knowledge base.

The present invention therefore provides for maintenance of a knowledge base 130 and an evidence set 120 derived there from.

What is claimed is:

1. A computer implemented method comprising:

receiving a query;

comparing the number of matching documents corresponding to the query and a predetermined number;

determining that the query should be modified based on the comparison; and automatically modifying the query using an evidence set, wherein the evidence set has a topic that corresponds to a first tern, and wherein the evidence set also has a second term, the topic being a parent to the second term.

2. The method of claim 1, wherein said step of modifying a query comprises:

receiving the query including the second term;

receiving a number of matching documents corresponding to the query;

replacing the second term with the first term in the query if the number of matching documents is less than a predetermined number; and submitting the query.

3. The method of claim 2, wherein the evidence set includes one of "access devices," "application services/content," "physical network and access," "platform services," or "technologies tools and languages" top-level topics.

4. The method of claim 1, wherein said step of modifying a query comprises:

receiving the query including the first term;

receiving a number of matching documents corresponding to the query;

replacing the first term with the second term in the query if the number of matching documents Is greater than a predetermined number; and submitting the query.

5. The method of claim 4, wherein the evidence set further includes a third term, the topic is a parent to the third term, the method further comprising the steps of:

presenting the third term and the second term to a user; and receiving a selection from the user.

6. An apparatus comprising:

a means for receiving a query;

a means for comparing the number of matching documents corresponding to the query and a predetermined number;

a means for determining that the query should be modified based on the comparison; and a means for automatically modifying a query using an evidence set, wherein the evidence set has a topic that corresponds to a first term, and wherein the evidence set also has a second term, the topic being a parent to the second term.

7. The apparatus of claim 6, wherein modifying a query comprises:

receiving the query including the second term;

receiving a number of matching documents corresponding to the query;

replacing the second term with the first term in the query if the number of matching documents is less than a predetermined number; and submitting the query.

8. The apparatus of claim 6, wherein modifying a query comprises:

receiving the query including the firm term;

receiving a number of matching documents corresponding to the query;

replacing the first term with the second term in the query if the number of matching documents is greater than a predetermined number; and submitting the query.

9. A computer implemented method comprising:

receiving a query at a server;

receiving a number of matching documents corresponding to the query;

deciding whether to expand a query restriction by comparing the number of matching documents to a predetermined number; and automatically expanding the query restriction if a decision was made to expand the query in said deciding step.

10. The method of claim 9, wherein a decision is made to expand the query if the number of matching documents is greater than the predetermined number.

11. The method of claim 9, wherein a decision is made to expand the query if the number of matching documents is less than the predetermined number.

12. An apparatus comprising:

a means for receiving a query from a network;

a means for receiving a number of matching documents corresponding to the query;

a means for deciding whether to expand the query restriction by the number of matching documents to a predetermined number; and a means for automatically expanding a query restriction if a decision was made to expand the query in said deciding step.

13. The apparatus of claim 12, wherein a decision is made to expand the query if the number of matching documents is greater than the predetermined number.

14. The apparatus of claim 12, wherein a decision is made to expand the query if the number of matching documents is less than the predetermined number.

* * * * *